3,369,042
N-(SUBSTITUTED PHENYL)ANTHRANILIC
ACIDS, SALTS, AND ESTERS THEREOF
Robert A. Scherrer, Ann Arbor, Mich., assignor to Parke Davis & Company, Detroit, Mich., a corporation of Michigan
No Drawing. Filed Apr. 7, 1964, Ser. No. 358,117
6 Claims. (Cl. 260—516)

The present invention relates to new anthranilic acid compounds and to methods for their production. More particularly, the invention relates to new N-arylanthranilic acids, which in their free acid form have the formula

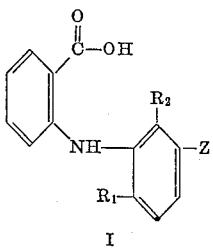

I to carboxylate salts thereof, to lower alkyl esters thereof, to di-lower alkyl-aminoalkyl esters thereof, and to pharmaceutically-acceptable acid-addition salts and quaternary salts of the di-lower alkyl-aminoalkyl esters thereof; where $R_1$ is hydrogen, methyl, ethyl or chlorine; $R_2$ is methyl, ethyl, or chlorine; and Z is a sulfamoyl group, having the formula

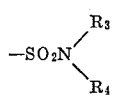

a thioether group, having the formula

a sulfoxide group, having the formula

—SO—lower alkyl or a sulfone group, having the formula

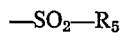

wherein $R_3$ is methyl or ethyl; $R_4$ is a hydrogen atom, a lower alkyl group containing less than 4 carbon atoms, a lower hydroxylalkyl group, or a phenyl radical; or $R_3$ and $R_4$ together with —N< represent a pyrrolidino or morpholino radical; and $R_5$ is a straight-chain or a branched-chain lower alkyl radical, a benzyl radical, or a phenyl radical, optionally substituted with lower alkyl or alkoxy.

In accordance with the invention, N-arylanthranilic acid compounds having the formula

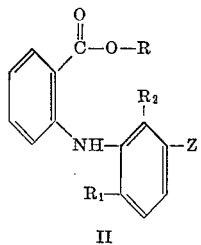

II are produced by reacting a benzoic acid derivative having the formula

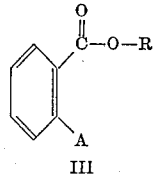

III with a compound of the formula

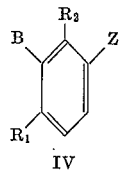

IV where $R_1$, $R_2$, and Z have the same significance as given above; R represents hydrogen, lower alkyl, or a metal, preferably an alkali metal, and one of A and B is halogen, preferably bromine, and the other is amino. Best results are obtained when A is halogen and B is amino. The reaction is preferably carried out in the presence of a copper-containing catalyst, such as cupric bromide or cupric acetate, and a proton acceptor. In carrying out the reaction, it is generally satisfactory to employ substantially equivalent quantities of the reactants in the presence of a suitable solvent. Some examples of such solvents are N,N-dimethylformamide, N,N-dimethylacetamide, diethylene glycol dimethylether, dimethyl sulfoxide, nitrobenzene, higher boiling hydrocarbons, and lower aliphatic alcohols, such as isopropyl alcohol, n-butyl alcohol, amyl alcohol, isoamyl alcohol, and the like. Preferred solvents are isopropyl alcohol, N,N-dimethylformamide, N,N-dimethylacetamide, and diethylene glycol dimethylether. The temperature and duration of the reaction may be varied over a wide range; a temperature in the range of 30–250° C. and a period of from 4 to 72 hours are satisfactorily employed.

The quantity of the proton acceptor employed in the reaction can be varied within wide limits. In general, sufficient amounts should be used to bind the benzoic acid reactant and the hydrohalic acid formed in the course of the reaction. Some of the proton acceptors which can be used when the benzoic acid derivative is employed in free acid form are alkali metal carbonates, preferably potassium carbonate; cupric carbonate; cuprous carbonate and the like. When an alkali metal salt, preferably the potassium salt, of the benzoic acid reactant is employed, the following substances can be used as the proton acceptor: calcium hydride, alkali metal carbonates such as, e.g., potassium carbonate and tertiary organic amines such as N-ethylmorpholine. If desired, two or more equivalents of the amine reactant can be used in which case one equivalent takes part in the condensation and the remainder acts as the proton acceptor.

The benzoic acid reactant is advantageously added to the reaction mixture in the form of its preformed alkali metal salt, preferably the potassium salt. Alternatively, the potassium salt of the benzoic acid reactant can be conveniently prepared in situ in a very finely divided condition by adding potassium carbonate to a boiling solution of the free acid form of the corresponding benzoic acid derivative in the solvent employed in the reaction. In the latter case, it is often advantageous to remove most of the water formed in the neutralization by distilling some of the solvent prior to the addition of the catalyst and other reactant.

The compounds of Formula IV, where B is amino, used as starting materials in the foregoing process, can be prepared in a number of ways. Those compounds of Formula IV where Z is a sulfamoyl group as defined above can be prepared by chlorosulfonation of a appropriate 2,5-disubstituted-acetanilide followed by amination of the resulting benzenesulfonyl chloride and by basic hydrolysis of the intermediate 2,6-disubstituted - 3 - sulfamoylacetanilide. The compounds of Formula IV where Z is a sulfamoyl group and $R_1$ is hydrogen can be prepared by the reductive dehalogenation of a 2-(lower alkyl)-3-sulfamoyl-6-chloroaniline compound. The compounds of Formula IV where Z is a thioether group as defined above can be prepared by reacting an appropriate 3-acetamido-2,4-disubstituted-benzenesulfonyl chloride with sodium metabisulfite, reducing the resulting disulfide compound with hydrazine, alkylating or arylating the resulting thiophenol compound or a salt thereof, and hydrolyzing the intermediate thioacetanilide compound with base. These latter compounds can also be prepared starting from an appropriately substituted nitrobenzene compound, in which case the final step is the reduction of the nitro group to an amino group. Those compounds of Formula IV where Z is a sulfoxide group as defined earlier can be prepared by the mild oxidation of an appropriate 2,6-disubstituted-3-(lower alkylthio)acetanilide compound, followed by basic hydrolysis of the acetamido group. Those compounds of Formula IV where Z is a sulfone group, in which $R_5$ is a straight-chain or branched-chain lower alkyl radical, can be prepared by oxidation of an appropriate 2,6-disubstituted-3-(lower alkylthio)acetanilide compound or an appropriate 2,6-disubstituted-3-(lower alkylthio)nitrobenzene compound, and subsequent basic hydrolysis of the acetamido group or reduction of the nitro group. Finally, those compounds of Formula IV where Z is a sulfone group, in which $R_5$ is phenyl, or phenyl substituted with lower alkyl or lower alkoxy, can be prepared by reaction of an appropriate 3-acetamido-2,4-disubstituted-benzenesulfonyl chloride compound with benzene or lower alkyl- or lower alkoxy-substituted benzene and aluminum chloride, followed by basic hydrolysis of the acetamido group.

The compounds of Formula IV, where B is halogen, also used as starting materials in the foregoing process, can be prepared by the diazotization, in hydrobromic or hydrochloric acid, of the compounds of Formula IV, where B is amino, followed by decomposition of the diazonium salt obtained in the presence of a copper catalyst.

Also in accordance with the invention, N-aryl-anthranilic acid compounds having the formula

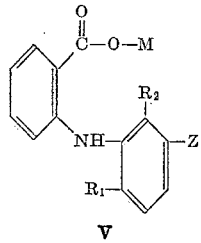

V are produced by hydrolysis of an N-acylated diphenylamine compound having the formula

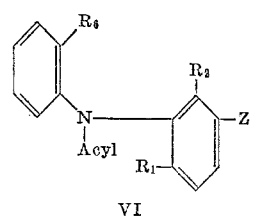

VI where $R_1$, $R_2$, and Z have the aforementioned significance, M is hydrogen or a metal, preferably an alkali metal, acyl represents an acyl radical, and $R_6$ is a carboxy group (either in free acid or salt form) or a group hydrolyzable to a carboxy group such as a cyano, carboalkoxy, carboaryloxy, carboarylalkoxy, carbamoyl, or carbonyl halide group. When Z in Formulas V and VI is a sulfamoyl group, the process is especially suitable for those compounds wherein the sulfamoyl group is a tertiary group, that is, where neither of $R_3$ or $R_4$ is hydrogen. The precise nature of the acyl group and the group hydrolyzable to a carboxy group is not critical because during the process the acyl group is removed and the hydrolyzable group is converted to a carboxyl group. Therefore, if desired, the acyl group and, in the appropriate cases, the group hydrolyzable to a carboxy group may contain one or more substitutents such as lower alkyl, lower alkoxy, halogen, nitro, carboxy and carboalkoxy groups, and as used herein the terms "acyl" and "group hydrolyzable to a carboxy group" will be understood to include the substituted as well as the unsubstituted radicals. The hydrolysis can be carried out either in an acidic or alkaline medium. An alkaline medium is preferred, especially for the hydrolysis of N-acylated diphenylamine compounds of Formula VI wherein Z is a thioether group. The hydrolysis in an alkaline medium can be effected by dissolving the N-acylated diphenylamine compound in a water-miscible, non-reactive organic solvent such as ethanol or methanol, adding a large excess of a concentrated aqueous solution of sodium or potassium hydroxide and allowing the hydrolysis to proceed (with or without stirring) until the reaction is complete. The hydrolysis is favored by temperatures in excess of 75° C. and is preferably effected at temperatures ranging from 75° C. to about 150° C. The hydrolysis not only removes the N-acyl group from the N-acylated diphenylamine compound but also converts the group hydrolyzable to a carboxy group, if present, to a carboxyl group. When alkaline reaction conditions are used, the N-arylanthranilic acid compound of Formula V is present in the reaction mixture in the form of a carboxylate salt while if acidic conditions are used, it is present as the free acid.

The N-acylated diphenylamine compounds of Formula VI used as starting materials in the foregoing process can be prepared in a number of ways. For example, an anilide having the formula

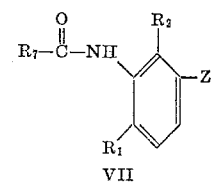

VII can be reacted with phosphorus pentachloride to produce a benzimidoyl chloride having the formula

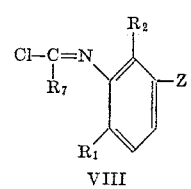

VIII and the benzimidoyl chloride reacted in the presence of a base with a phenol compound having the formula

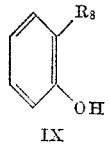

IX or an alkali metal salt thereof and the resulting imidoester having the formula

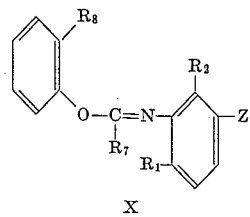

X is subjected to intramolecular rearrangement by heating to obtain an N-acylated diphenylamine compound having the formula

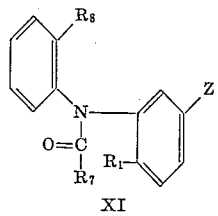

XI where $R_1$, $R_2$, and Z are as defined previously; $R_7$ is a tertiary alkyl group, such as a tertiary butyl group or an aryl radical, preferably a phenyl radical that may optionally contain one or more substituents such as halogen, nitro, lower alkyl, lower alkoxy, carboxy, and carboalkoxy groups; and $R_8$ is a cyano, carboalkoxy, carboaryloxy, carboarylalkoxy, or carbamoyl group.

The N-acylated diphenylamine compounds of Formula VI wherein $R_6$ is a carbonyl halide group can be prepared by the reaction of an N-acylated diphenylamine compound of Formula XI wherein $R_8$ is a carboxy group with a halogenating agent, such as thionyl chloride.

Further in accordance with the invention, N-arylanthranilic acids having the formula

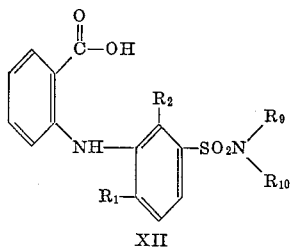

XII and carboxylate salts thereof are produced by the reaction of an N-arylanthranilic acid having the formula

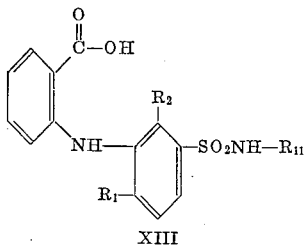

XIII with an alkylating agent in the presence of a base; where $R_9$ is lower alkyl; $R_{10}$ is lower alkyl or phenyl; and $R_{11}$ is hydrogen, lower alkyl, or phenyl; and $R_1$ and $R_2$ are as defined earlier. Suitable alkylating agents for use in this process are lower alkyl halides, such as methyl iodide and ethyl bromide; lower alkyl esters of inorganic acids and organic sulfonic acids, such as dimethyl sulfate, diethyl sulfate, methyl benzenesulfonate, and methyl p-toluenesulfonate; and trialkyloxonium fluoborates, such as triethyloxonium fluoborate. This alkylation reaction is readily carried out in the presence of a base; suitable bases for this purpose are alkali metal hydroxides, alkali metal alkoxides, alkali metal hydrides and alkali metal amides. Equivalent amounts of reactants may be used, but it is preferable to employ the base and alkylating agent in excess. When $R_{11}$ in Formula XIII is hydrogen, best results are obtained when at least three equivalents of both the base and the alkylating agent are used per equivalent of N-aryl anthranilic acid; when $R_{11}$ is lower alkyl or phenyl, it is best to use at least two equivalents of base and alkylating agent. The reaction is advantageously carried out in a solvent medium. The choice of solvent will depend somewhat on the base used. Thus, for use with an alkali metal hydroxide, the preferred solvents are water, lower alkanols, or mixtures of these; for use with an alkali metal alkoxide, the preferred solvents are lower alkanols, ethers, such as tetrahydrofuran and glycol ethers, and N,N-dimethylformamide; for use with an alkali metal hydride or an alkali metal amide, the preferred solvents are ethers, such as diethyl ether, tetrahydrofuran, and glycol ethers, and N,N-dimethylformamide. The time and temperature of the reaction are not critical and may be varied over a wide range, depending on the nature of the solvent and the alkylating agent employed. When the alkylation reaction is complete, an excess of aqueous alkali or mineral acid is added to the reaction mixture to hydrolyze any carboxylic acid ester formed. When this hydrolysis is effected by aqueous alkali, the N-arylanthranilic acid product of Formula XII is present in the reaction mixture in the form of a carboxylate salt, and the free acid can be obtained by acidification of the alkaline hydrolysis mixture. If acidic hydrolysis conditions are used, the free acid of Formula XII is obtained directly from the reaction mixture.

Further in accordance with the invention, N-arylanthranilic acids having the formula

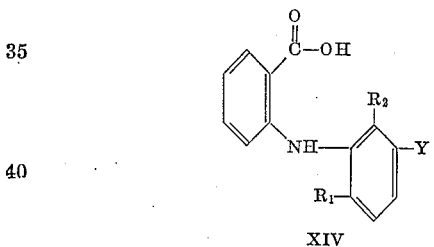

XIV and carboxylate salts thereof are produced by the reaction of an N-arylanthranilic acid having the formula

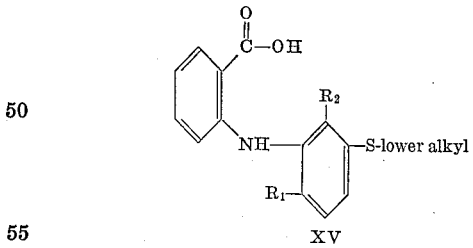

XV with an oxidizing agent; where $R_1$ and $R_2$ are as defined earlier and Y is a sulfoxide group, having the formula —SO—lower alkyl or a sulfone group, having the formula —SO$_2$—lower alkyl.

Suitable oxidizing agents for use in the reaction are alkali metal metaperiodates, such as sodium metaperiodate, hydrogen peroxide, peracetic acid, perbenzoic acid, and m-chloroperbenzoic acid. An alkali metal metaperiodate, such as sodium metaperiodate, and hydrogen peroxide are preferred. The amount of oxidizing agent will vary according to the nature of the product desired. When it is desired to prepare N-arylanthranilic acids of Formula XIV where Y is a sulfoxide group, only one equivalent of oxidizing agent is used. To prepare N-arylanthranilic acids of Formula XIV where Y is a sulfone group, at least two equivalents, and preferably an excess, of oxidizing agent is employed. The reaction is best carried out in a solvent medium. Suitable solvents are water; lower alkanols, such as ethanol and methanol; lower alkanoic acids, such as acetic acid; lower aliphatic ketones, such as acetone; halogenated aliphatic hydrocarbons, such as methylene chloride and chloroform; benzene; and appropriate mixtures of these. The preferred solvents for use with alkali metal metaperiodates and hydrogen peroxide are water, lower alkanols, lower alkanoic acids, lower aliphatic ketones, and mixtures of these. When water is used as the solvent, it is preferable to carry out the reaction in the presence of a base so as to render the starting N-arylanthranilic acid of Formula XV more soluble. Suitable bases for this purpose are alkali metal hydroxides. When the reaction is carried out in the presence of a base, the N-arylanthranilic acid product of Formula XIV is present in the reaction mixture in the form of a carboxylate salt, and the free acid can be obtained by acidification of the alkaline reaction mixture. The temperature and duration of the reaction are not critical and will vary according to the nature of the product desired. For the preparation of N-arylanthranilic acids of Formula XIV where Y is a sulfoxide group, the preferred conditions are a temperature in the range of 20–60° C. and a time of one to 24 hours. For the preparation of N-arylanthranilic acids of Formula XIV where Y is a sulfone group, a temperature of from 75 to 110° C. for a period of 15 minutes to 2 hours is preferred.

Also in accordance with the invention, N-arylanthranilic acid compounds having the formula

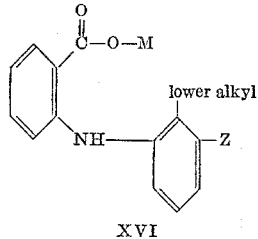

XVI are produced by the reaction of N-arylanthranilic acid compounds having the formula

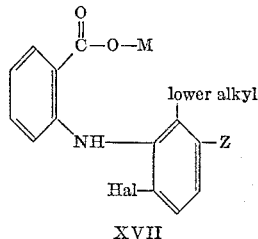

XVII with gaseous hydrogen in an inert solvent in the presence of a hydrogenation catalyst; where M and Z are as defined previously and Hal is chlorine, bromine, or iodine. Hydrogenation catalysts that may be used in this reaction are noble metal catalysts, such as platinum oxide, palladium oxide, platinum or palladium, used as finely divided powders either in the free state or supported on an inert carrier such as charcoal, and nickel catalysts, such as Raney nickel. When a noble metal catalyst is used, it is preferable to add to the reaction mixture a quantity of an alkali metal acetate, such as sodium acetate, equivalent to the amount of N-arylanthranilic acid compound of Formula XVII used. When a nickel catalyst is used, best results are obtained in the presence of an equivalent amount of alkali metal hydroxide. Suitable solvents for the reaction are lower alkanols, N,N-dimethylformamide, tetrahydrofuran, water and mixtures of these. A preferred solvent is a mixture of ethanol and water. Gaseous hydrogen is supplied to the reaction under pressure, which may vary from one to 10 atmospheres. In the usual case, hydrogen pressures of about 2 to 4 atmospheres are sufficient to complete the reaction within a reasonable time. In each instance, the reaction is allowed to proceed until the required amount of hydrogen has been taken up. The reaction is normally carried out at room temperature, although the temperature may be varied over a wide range, from 20 to 90° C.

The lower alkyl N-arylanthranilate compounds of the invention having the formula

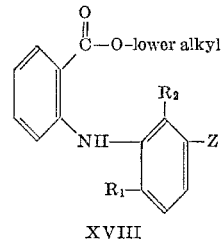

XVIII are produced by reacting an N-arylanthranilic acid having the formula

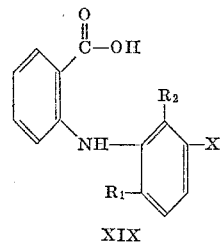

XIX or a reactive derivative thereof with an esterifying agent; where $R_1$, $R_2$, and Z are as defined previously. Some examples of suitable reactive derivatives are the acid anhydride, acid halides, and alkali metal salts of the acid. Some examples of suitable esterifying agents are lower alkanols, such as methanol and ethanol, esters of lower alkanols, such as methyl bromide, methyl iodide, ethyl iodide, and dimethyl sulfate, and diazomethane.

When the esterifying agent is a lower alkanol, the process is preferably carried out by heating the free acid or the anhydride or halide in an excess of the lower alkanol. An acidic catalyst such as hydrogen chloride, sulfuric acid or benzenesulfonic acid is used when the free acid or the anhydride is one of the reactants. Additional solvents such as tetrahydrofuran, dioxane or diethylene glycol dimethyl ether may be present but are not necessary. The reaction is commonly carried out at a tempearture in excess of 25° C., preferably at 60–150° C., but not higher than the reflux temperature, and is normally completed within 5 to 100 hours with the free acid or within 1 to 5 hours with the anhydride or a halide.

When the esterifying agent is an ester of a lower alkanol as described above, the process is preferably carried out by heating the anthranilic acid or salt thereof with the selected alkyl halide, dialkyl sulfate, or other alkyl ester derivative in a solvent in the presence of a base. Some examples of suitable solvents are lower alkanols, tetrahydrofuran, dioxane, dimethylformamide, diethylene glycol dimethyl ether, and mixtures thereof. Some examples of suitable bases are alkali metal hydroxides and carbonates, alkaline earth metal hydroxides, alkali metal alkoxides, and, in nonhydroxylic solvents, alkali metal hydrides. At least one equivalent and preferably an excess of the esterifying agent is used. The reaction is usually carried out at a temperature from 25 to 150° C., preferably from 50 to 100° C., and under these conditions it is substantially complete within 24 hours.

When the esterifying agent is diazomethane, the process is preferably carried out in a unreactive solvent such as ether, tetrahydrofuran, diethylene glycol dimethyl ether or dioxane. The reaction proceeds very rapidly and is preferably carried out by treating the free acid with one equivalent or a slight excess of diazomethane at 0 to 25° C., under which conditions the esterification is complete within less than 5 minutes.

The reactive derivatives of the N-aryl-anthranilic acids of Formula XIX required as starting materials in the foregoing process are prepared in a number of ways. The acid halides are prepared by reacting the free N-arylanthranilic acids of Formula XIX with a halogenating agent, such as thionyl chloride. The alkali metal salts are prepared by reacting the free acids with an alkali metal hydroxide. The acid anhydrides are prepared by reacting an alkali metal salt of the free acid with the acid chloride.

The di-lower alkyl-aminoalkyl N-arylanthranilate compounds of the invention, having the formula

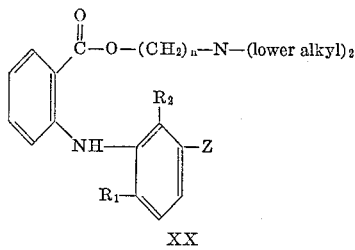

XX and acid-addition salts thereof are produced by esterifying an N-arylanthranilic acid having the formula

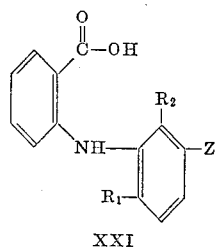

XXI or a reactive derivative thereof with an aminoalcohol of the formula

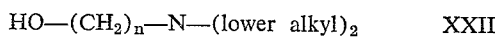

HO—(CH$_2$)$_n$—N—(lower alkyl)$_2$     XXII or a reactive derivative thereof; where $n$ is 2, 3, or 4 and R$_1$, R$_2$, and Z are as defined before. This esterification can be carried out in a number of ways. One of the preferred methods involves reacting the N-aryl-anthranilic acid of Formula XXI with a di-lower alkyl-aminoalkyl halide of the formula

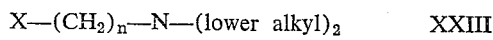

X—(CH$_2$)$_n$—N—(lower alkyl)$_2$     XXIII where X is a halogen atom, preferably chlorine or bromine, and $n$ is as defined above. The di-lower alkyl-aminoalkyl halide is preferably utilized in the form of the corresponding hydrohalide salt. For reasons of economy the reaction is usually carried out in the presence of one or more equivalents of a substance having a greater base strength than the di-lower alkyl-aminoalkyl halide. Some examples of suitable basic compounds are tertiary amines such as triethylamine, and N-ethyl-piperidine and inorganic bases such as the alkali metal carbonates, alkali metal bicarbonates, alkaline earth metal carbonates, alkaline earth metal oxides and the like. The reaction is carried out under substantially anhydrous conditions and in an inert organic solvent such as N,N-dimethylformamide, benzene, xylene, toluene and the like. The relative quantities of the reactants are not particularly critical. Usually, the N-arylanthranilic acid and the di-lower alkyl-aminoalkyl halide are used in approximately equivalent quantities. When the free N-arylanthranilic acid and the free base of the di-lower alkyl-aminoalkyl halide are so used, approximately one equivalent of a basic compound is employed and the desired di-lower alkyl-aminoalkyl ester is obtained in the reaction mixture as the free base. Alternatively, when a hydrohalide salt of the di-lower alkyl-aminoalkyl halide is employed, approximately two equivalents of the basic compound are preferably used and the di-lower alkyl-aminoalkyl ester is again obtained as the free base. The temperature of the reaction is not critical and may be varied from about 50 to 125° C. The preferred reaction temperature is in the neighborhood of 100° C., that is, between about 85 and 110° C.

The esterification can also be carried out by reacting an acid halide, preferably an acid chloride, of the N-arylanthranilic acid of Formula XXI with an amino alcohol of Formula XXII. The reaction can be carried out by dissolving the reactants in an inert organic solvent and allowing the reaction mixture to stand at ordinary temperature, that is, 20 to 25° C. Some of the organic solvents that can be used for the reaction are aromatic hydrocarbons, such as benzene, xylene, and toluene; aliphatic hydrocarbons, such as pentane and petroleum ether; and ethers, such as diethyl ether, dibutyl ether, and dioxane. The relative quantities of the two reactants are not critical but it is preferable to use approximately two equivalents of the aminoalcohol for each equivalent of the N-arylanthranilic acid chloride.

The di-lower alkyl-aminoalkyl N-arylanthranilate compounds of the invention form acid-addition salts with a variety of inorganic and organic acids. Some examples of pharmaceutically-acceptable acid-addition salts that can be prepared either as described above or by reaction with the corresponding acid are the hydrochloride, hydrobromide, sulfate, phosphate, hydriodide, acetate, propionate, citrate, tartrate, benzoate, sulfamate, and benzenesulfonate. The di-lower alkyl-aminoalkyl N-arylanthranilates also form pharmaceutically-acceptable quaternary ammonium salts by reaction of the free bases with an alkyl halide, such as methyl bromide, methyl iodide, and ethyl iodide.

The free N-arylanthranilic acids of Formula I form pharmaceutically-acceptable salts with a variety of inorganic and organic bases. Some typical examples of these salts are the sodium, potassium, calcium, ammonium, choline, 2-hydroxyethylammonium, bis(2-hydroxyethyl)ammonium, tris(2-hydroxyethyl)ammonium and like salts. Preferred salts are the pharmaceutically-acceptable salts of an alkali metal, an alkaline earth metal, ammonia or a substituted ammonia.

The N-arylanthranilic acids of Formula I, their pharmaceutically-acceptable salts, the lower alkyl esters thereof, the di-lower alkyl-aminoalkyl esters thereof, and the pharmaceutically-acceptable acid-addition salts and quaternary salts of the di-lower alkyl-aminoalkyl esters thereof possess a high degree of anti-inflammatory activity, and hence are of value in mitigating the symptoms associated with inflammatory conditions as well as in preventing or suppressing the occurrence of inflammation. The preferred compounds for use as anti-inflammatory agents are the free N-arylanthranilic acids of Formula I and their pharmaceutically-acceptable salts. The compounds of the invention also exhibit antipyretic activity, as well as anti-allergic activity. Their anti-allergic activity is demonstrated by their antagonism toward bradykinin. This effect is observed as a suppression of the bronchoconstriction produced by bradykinin in laboratory animals, especially in guinea pigs. They are preferably administered by the oral route. The di-lower alkyl-aminoalkyl N-arylanthranilates are preferably administered in the form of one of their pharmaceutically-acceptable acid-addition salts.

The preferred compounds of the invention, because of their high anti-inflammatory activity, are the N-arylanthranilic acids having the formula

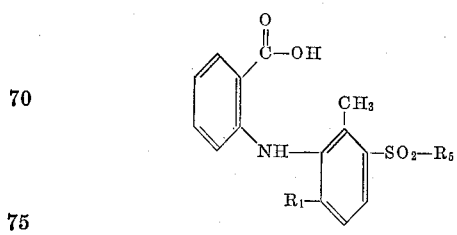

and pharmaceutically-acceptable salts thereof; where $R_1$ is hydrogen or methyl and $R_5$ is as defined previously.

The invention is illustrated by the following examples:

*Example 1*

A mixture consisting of 9.32 g. of potassium o-bromobenzoate, 8.3 g. of 3-amino-$N^1,N^1,2,4$-tetramethylbenzenesulfonamide, 4.5 g. of N-ethylmorpholine, 0.4 g. of anhydrous cupric acetate, and 10 ml. of dry N,N-dimethylformamide is stirred and heated under nitrogen at 115–125° C. for three hours. The reaction mixture is diluted with about 50 ml. of water and acidified with dilute hydrochloric acid. The solid N-(2,6-dimethyl-3-dimethylsulfamoylphenyl)anthranilic acid obtained is stirred with hot water and crystallized from acetic acid. The solid can be purified further by chromatography over activated magnesium silicate (Florisil) in a 1:1 mixture of benzene and ether and recrystallizations from benzene and from aqueous ethanol; M.P. 172–172.5° C.

The potassium salt of N-(2,6-dimethyl-3-dimethylsulfamoylphenyl)anthranilic acid is prepared by treating a solution of 1.0 g. of the free acid in ethanol with an equivalent amount of potassium hydroxide dissolved in ethanol, and evaporating the resulting mixture to dryness under reduced pressure.

By utilizing a procedure esentially like that described above, the following N-arylanthranilic acids are obtained from the reaction of potassium o-bromobenzoate with the designated aminobenzenesulfonamide compounds:

(a) From reaction with 3-amino-$N^1,N^1$,-diethyl-2,4-dimethylbenzenesulfonamide there is obtained N-(2,6-dimethyl-3-diethylsulfamoylphenyl)anthranilic acid; M.P. 186–187° C.

(b) From reaction with 3-amino - $N^1$,2,4 - trimethylbenzenesulfonamide there is obtained N-(2,6-dimethyl-3-methylsulfamoylphenyl)anthranilic acid; M.P. 220–222° C.

(c) From reaction with 3-amino-4-chloro-$N^1,N^1$,2-trimethylbenzenesulfonamide there is obtained N-(6-chloro-2-methyl-3 - dimethylsulfamoylphenyl)anthranilic acid; M.P. 201–202° C.

(d) From reaction with 3-amino-2,4-diethyl-$N^1,N^1$-dimethylbenzenesulfonamide there is obtained N-(2,6-diethyl-3-dimethylsulfamoylphenyl)anthranilic acid; M.P. 156–157° C.

The preparation of the aminobenzenesulfonamide compounds used as starting materials in the foregoing procedure can be illustrated by the preparation of 3-amino-$N^1$,$N^1$,2,4-tetramethylbenzenesulfonamide according to the following procedure.

2,6-dimethylacetamide (25 g.) is added in portions with stirring to 150 ml. of chlorosulfonic acid while the temperature is maintained at 20° C. After standing at room temperature of one hour, the mixture is warmed for a few minutes at 40° C., allowed to cool, and is poured slowly onto ice. The solid 3-acetamido-2,6-dimethylbenzenesulfonyl chloride obtained is isolated, washed with water and dried; M.P. 144–145° C. To a solution of 26.2 g. of 3-acetamido-2,4-dimethylbenzenesulfonyl chloride in 100 ml. of methanol is slowly added, with stirring, 45 g. of 25% aqueous dimethylamine. After standing at room temperature for one hour, the solution is diluted with 500 ml. of water and evaporated under reduced pressure to a volume of 250 ml. The solid 3-acetamido-$N^1,N^1$,2,4-tetramethylbenzenesulfonamide obtained is isolated, washed with water, dried, and crystallized from benzenecyclohexane; M.P. 139–140° C. A solution of 11.9 g. of 3-acetamido-$N^1,N^1$,2,4-tetramethylbenzensulonamide and 60 g. of 85% aqueous potassium hydroxide in 190 ml. of 80% aqueous ethylene glycol is heated under reflux for 4 hours. After cooling, the solution is diluted with water and the solid 3-amino-$N^1,N^1$,2,4-tetramethylbenzenesulfonamide obtained is isolated and crystallized from aqueous methanol; M.P. 67–68.5° C.

*Example 2*

A mixture consisting of 21.3 g. of potassium o-bromobenzoate, 20.0 g. of 3-amino-2,4-dichloro-$N^1,N^1$-dimethylbenzenesulfonamide, 1.2 ml. of N-ethylmorpholine, 2.4 g. of cupric acetate, and 25 ml. of N,N-dimethylacetamide is stirred and heated under nitrogen at 100–105° C. for 70 hours. The reaction mixture is diluted with an equal volume of water, made alkaline with dilute aqueous sodium hydroxide, filtered, and the filtrate extracted with ether to remove unreacted starting material. The alkaline solution is acidified with dilute hydrochloric acid and the solid N-(2,6-dichloro-3-dimethylsulfamoylphenyl)anthranilic acid obtained is isolated and crystallized from aqueous ethanol.

N-(2,6-dichloro - 3 - dimethylsulfamoylphenyl)anthanilic acid (2.0 g.) is suspended in 20 ml. of acetone and one equivalent of diethanolamine in 10 ml. of acetone is added with stirring. The clear solution is diluted with 20 ml. of petroleum ether, and the solution is allowed to stand at room temperature. The diethanolamine salt of N - (2,6-dichloro-3-dimethylsulfamoylphenyl)anthranilic acid that crystallizes is collected and dried.

The 3-amino-2,4-dichloro - $N^1,N^1$-dimethylbenzenesulfonamide used as starting material in the above procedure can be prepared as follows. A solution of 14.8 g. of 2,6-dichloro-3-nitroaniline in 250 ml. of acetic acid is treated with 18 ml. of acetic anhydride and a few drops of 70% perchloric acid. The solution is heated at 80° C. for 2 hours, then poured into 1500 ml. of water and the solid 2,6-dichloro-3-nitroacetanilide obtained is isolated, washed with water, dried, and crystallized from 50% aqueous ethanol; M.P. 186–187° C. This product (6.3 g.) is suspended in 400 ml. of ethyl acetate, 0.4 g. of 10% platinum on charcoal is added, and the mixture is shaken with hydrogen at one atmosphere pressure until hydrogen uptake ceases. The catalyst is removed by filtration, and the filtrate is evaporated to dryness to give 3-amino-2,6-dichloroacetanilide; M.P. 219–221° C., after crystallization from aqueous ethanol. 3-amino-2,6-dichloroacetanilide (45 g.) is dissolved in 100 ml. of concentrated hydrochloric acid and a solution of 15.6 g. of sodium nitrite in 25 ml. of water is carefully added at 0–5° C. After 30 minutes, the reaction mixture is added to a cooled solution of 30% sulfur dioxide in 200 ml. of acetic acid, to which a saturated solution of 10 g. of cupric chloride dihydrate in water had been added. When nitrogen evolution ceases, the mixture is diluted with three volumes of ice water, and the 3-acetamide-2,4-dichlorobenzenesulfonyl chloride obtained is isolated and dissolved in ether. The ethereal solution is washed successively with water, cold sodium carbonate solution, and water again, dried, and evaporated to dryness to give the desired product, used without purification. The 3-acetamido-2,4-dichlorobenzenesulfonyl chloride is reacted with aqueous dimethylamine and the 3-acetamido-2,4-dichloro-$N^1,N^1$-dimethylbenzenesulfonamide obtained is hydrolyzed with aqueous potassium hydroxide to give 3-amino-2,4-dichloro - $N^1,N^1$-dimethylbenzenesulfonamide according to the procedure described in Example 1 above for the preparation of 3-amino-$N^1,N^1$,2,4-tetramethylbenzenesulfonamide.

*Example 3*

A mixture consisting of 34.2 g. of potassium o-bromobenzoate, 24.2 g. of N-(3-amino-2,4-dimethylbenzenesulfonyl)pyrrolidine, 11.9 ml. of N-ethylmorpholine, 1.0 g. of cupric bromide, and 30 ml. of dry N,N-dimethylformamide is stirred and heated under nitrogen at 120–140° C. for two hours. The reaction mixture is diluted with an equal volume of water, made alkaline with dilute aqueous sodium hydroxide, filtered, and extracted with ether to remove unreacted starting material. The alkaline mixture is then acidified with dilute hydrochloric acid and the solid N-[2,6-dimethyl-3-(1-pyrrolidylsulfonyl)phenyl)phenyl]anthranilic acid obtained is isolated, washed with hot water, and crystallized successively from benzene-cyclohexane and aqueous ethanol; M.P. 202–204° C.

The ammonium salt of N-[2,6-dimethyl-3-(1-pyrrolidylsulfonyl)phenyl]anthranilic acid is prepared by dissolving the free acid in hot ethanol, treating the solution with an excess of ammoniacal ethanol, and evaporating the mixture to dryness under reduced pressure.

By utilizing the foregoing procedure, with the substitution of 27.0 g. of N-(3-amino-2,4-dimethylbenzenesulfonyl)morpholine for N-(3-amino-2,4-dimethylbenzenesulfonyl)pyrrolidine, there is obtained N-[2,6-dimethyl-3-(1-morpholinylsulfonyl)phenyl] anthranilic acid, M.P. 160–162° C., after crystallization from aqueous ethanol.

The N-(3-amino-2,4-dimethylbenzenesulfonyl)-pyrrolidine and N-(3-amino-2,4-dimethylbenzenesulfonyl)morpholine used as starting materials can be prepared by utilizing the procedure described in Example 1 for the preparation of 3-amino-$N^1,N^1$,2,4 - tetramethylbenzenesulfonamide with the substitution of 17.8 g. of pyrrolidine and of 17.4 g. of morpholine, respectively, for dimethylamine.

*Example 4*

By utilizing the procedure described in Example 3 above, from the reaction of a mixture consisting of 13.3 g. of potassium o-bromobenzoate, 12.0 g. of 3-amino-$N^1$,2,4-trimethyl - $N^1$ - (β-hydroxyethyl)benzenesufonamide, 0.9 ml. of N-ethylmorpholine, 1.86 g. of cupric bromide, and 23 ml. of N,N-dimethylacetamide, there is obtained N-[2,6-dimethyl-3-(N-β-hydroxyethyl-N-methylsulfamoyl)-phenyl] anthranilic acid; M.P. 178–179° C., after crystallization from benzene-methanol.

The 3-amino-$N^1$,2,4-trimethyl - $N^1$ - (β-hydroxyethyl)benzenesulfonamide used as starting material in the above procedure is prepared by reacting 3-acetamido-2,4-dimethylbenzenesulfonyl chloride with N-methylethanolamine in the presence of triethylamine and hydrolyzing the intermediate 3-acetamido - $N^1$,2,4 - trimethyl-$N^1$-1(β-hydroxyethyl)benzenesulfonamide to remove the N-acetyl group.

*Example 5*

A mixture consisting of 4.6 g. of potassium o-bromobenzoate, 3.4 g. of 3-amino-$N^1,N^1$,2-trimethylbenzenesulfonamide, 0.26 ml. of N-ethylmorpholine, 0.5 g. of anhydrous cupric acetate, and 6.3 ml. of dry N,N-dimethylformamide is stirred and heated under nitrogen at 100–105° C. for 48 hours. The reaction mixture is diluted with an equal volume of water, made alkaline with dilute aqueous sodium hydroxide, filtered, and extracted with ether to remove unreacted starting material. The alkaline solution is then acidified with dilute hydrochloric acid and the solid N-(2-methyl - 3 - dimethylsulfamoylphenyl)anthranilic acid obtained is isolated, washed with hot water, and crystallized twice from aqueous ethanol; M.P. 192–194° C.

The 3-amino - $N^1,N^1$,2 - trimethylbenzenesulfonamide used as starting material in the foregoing procedure is prepared as follows. A mixture of 7.7 g. of 3-amino-4-chloro-$N^1,N^1$,2-trimethylbenzenesulfonamide, 2.6 g. of sodium acetate, and 0.5 g. of 20% palladium on carbon in 250 ml. of methanol is treated at room temperature with hydrogen at a pressure of 3 atmospheres for one hour or until hydrogen uptake ceases. The catalyst is removed by filtration, and the filtrate is evaporated to dryness under reduced pressure. The residue obtained is dissolved in ether and the ether solution is washed, first with dilute aqueous sodium hydroxide and then with water. After drying over anhydrous magnesium sulfate, the dried solution is evaporated to dryness to give 3-amino-$N^1,N^1$,2-trimethylbenzenesulfonamide, M.P. 118–122° C., after two crystallizations from absolute ethanol.

*Example 6*

A mixture consisting of 6.5 g. potassium o-bromobenzoate, 3.8 g. of 2,6-dimethyl-3-methylthioaniline, 0.4 ml. of N-ethylmorpholine, 0.8 g. of cupric acetate and 9 ml. of dry N,N-dimethylacetamide is stirred and heated under nitrogen at 105° C. for 24 hours. The reaction mixture is diluted with an equal volume of water, made alkaline with aqueous sodium hydroxide, filtered and extracted with ether to remove unreacted starting material. The alkaline solution is then acidified with hydrochloric acid and the solid N-(2,6-dimethyl-3-methythiophenyl)anthranilic acid obtained is washed with hot water and crystallized several times from ethanol; M.P. 210–211° C.

The sodium salt of N-(2,6-dimethyl - 3 - methylthiophenyl)anthranilic acid can be prepared by dissolving the free acid in hot ethanol, treating the solution with an equivalent amount of sodium hydroxide in ethanol and evaporating the resulting mixture to dryness under reduced pressure.

By utilizing the procedure described above, the following N-arylanthranilic acids are obtained from the reaction of potassium o-bromobenzoate with the specified 2,6-disubstituted thioaniline compounds:

(a) From reaction with 2,6-dimethyl-3-ethylthioaniline there is obtained N-(2,6-dimethyl-3-ethylthiophenyl)anthranilic acid.

(b) From reaction with 2-methyl-6-chloro-3-methylthioaniline there is obtained N-(6-chloro-2-methyl-3-methylthiophenyl)anthranilic acid.

(c) from reaction with 2,6-dimethyl-3-n-pentylthioaniline there is obtained N-(2,6-dimethyl-3-n-pentylthiophenyl)anthranilic acid.

(d) From reaction with 2,6-dimethyl-3-benzylthioaniline there is obtained N-(2,6-dimethyl-3-benzylthiophenyl)anthranilic acid.

The preparation of the 2,6-disubstituted thioaniline compounds used as starting material in the foregoing procedure can be illustrated by the preparation of 2,6-dimethyl-3-methylthioaniline according to the following procedure.

Sodium metabisulfite (86.5 g.) is added in portions over a 2 hour period at 60–65° C. to a mixture of 100 g. of 3-acetamido-2,4,-dimethylbenzenesulfonyl chloride, 2.9 g. of potassium iodide, 3 ml. of 6 N hydrochloric acid and 10 ml. of water in 235 ml. of dioxane. The mixture is heated for an additional hour at 65° C. and is then allowed to stand at room temperature for 16 hours. After dilution with 500 ml. of water, the solid bis(3-acetamido-2,4-dimethylphenyl)disulfide obtained is isolated and crystallized from N,N-dimethylformamide, M.P. 246.5–248.5° C. A mixture of 5.0 g. of bis(3-acetamido-2,4-dimethylphenyl)disulfide, 20 ml. of pyridine, and 6.4 ml. of hydrazine hydrate is heated under reflux for 5 hours. After cooling and acidification with dilute hydrochloric acid, the solid obtained is dissolved in dilute aqueous sodium hydroxide and the alkaline solution is purified by filtration. Upon acidification of the filtrate with dilute hydrochloric acid, there is obtained 3-acetamido-2,4-dimethylthiophenol; M.P. 166–167° C. To a solution of 9.3 g. of 3-acetamido-2,4-dimethylthiophenol and 2.0 g. of sodium hydroxide in 10 ml. of water is added 6.0 g. of dimethyl sulfate over a 30-minute period. The mixture is kept at room temperature for 90 minutes more while a small amount of 10% aqueous sodium hydroxide is periodically added to keep the mixture alkaline. The solid 2,6-dimethyl-3-methylthioacetanilide is isolated, washed with water and crystallized from ethanol; M.P. 169–172° C. A solution of 5.0 g. of 2,6-dimethyl-3-methylthio-acetanilide and 30 g. of 85% aqueous potassium hydroxide in 95 ml. of 80% aqueous ethylene glycol is heated under reflux for 16 hours. After cooling and dilution with 200 ml. of water, the solution is extracted successively with 100 ml. of ether and 100 ml. of benzene. The combined organic extracts are dried over anhydrous magnesium sulfate and the dried solution is evaporated to dryness under reduced pressure to give 2,6-dimethyl-3-methylthioaniline used without further purification.

Example 7

A mixture consisting of 6.5 g. of potassium o-bromobenzoate, 4.8 g. of 3-t-butylthio-2,6-dimethylaniline, 0.4 ml. of N-ethylmorpholine, 0.8 g. of cupric acetate, and 9 ml. of dry N,N-dimethylacetamide is stirred and heated under nitrogen at 105° C. for 24 hours. The mixture is diluted with an equal volume of water, made alkaline with aqueous sodium hydroxide, filtered and extracted with ether to remove unreacted starting material. The alkaline solution is acidified with hydrochloric acid and the solid N-(3-t-butylthio-2,6-dimethylphenyl)anthranilic acid obtained is washed with hot water and dried; M.P. 168–170.5° C. after purification by chromatography over activated magnesium silicate (Florisil) in benzene and crystallization from n-heptane.

The calcium salt of N-(3-t-butylthio-2,6-dimethylphenyl)anthranilic acid can be prepared by dissolving the free acid in hot ethanol, treating the solution with an equivalent amount of calcium hydroxide in ethanol, and evaporating the mixture to dryness under reduced pressure.

The 3-t-butylthio-2,6-dimethylaniline used as a starting material in the foregoing procedure is prepared by reacting 2-nitro-m-xylene with chlorosulfonic acid to obtain 2,4-dimethyl-3-nitrobenzenesulfonyl chloride, reacting this product with sodium metabisulfite to obtain bis(2,4-dimethyl-3-nitrophenyl)disulfide, reducing this disulfide intermediate with hydrazine hydrate in ethanol solution to obtain 2,4-dimethyl-3-nitrothiophenol, alkylating this thiophenol compound with t-butyl alcohol in 80% sulfuric acid to obtain 3-t-butylthio-2,6-dimethylnitrobenzene, and, finally, catalytically reducing this last intermediate with hydrogen at 3 atmospheres pressure in the presence of Raney nickel to obtain the desired 3-t-butylthio-2,6-dimethylaniline.

Example 8

By utilizing the procedure described in Example 7 above, from the reaction of a mixture consisting of 6.5 g. of potassium o-bromobenzoate, 5.3 g. of 2,6-dimethyl-3-phenylthioaniline, 0.4 ml. of N-ethylmorpholine, 0.8 g. of cupric acetate, and 9 ml. of dry N,N-dimethylacetamide, there is obtained N-(2,6-dimethyl-3-phenylthiophenyl)anthranilic acid; M.P. 197.5–198.5° C.

The 2,6-dimethyl-3-phenylthioaniline used as a starting material in the above procedure is prepared by reacting 2,4-dimethyl-3-nitrothiophenol with cuprous oxide to obtain cuprous 2,4 - dimethyl - 3 - nitrothiophenolate, M.P. >300° C.; reacting this cuprous salt with bromobenzene in a 3:1 mixture of quinoline and pyridine to obtain 2,6 - dimethyl - 3-phenylthionitrobenzene, M.P. 64.5–66° C.; and catalytically reducing the nitrobenzene product with hydrogen in the presence of Raney nickel to obtain the desired 2,6-dimethyl-3-phenylthioaniline, M.P. of hydrochloride salt, 181–188° C.

Example 9

By utilizing the procedure described in Example 7 above, from the reaction of a mixture consisting of 4.5 g. of potassium o-bromobenzoate, 3.1 g. of 2,6-dimethyl-3-methylsulfonylaniline, 0.25 ml. of N-ethylmorpholine, and 0.5 g. of cupric acetate in 5 ml. of N,N-dimethylacetamide, there is obtained N-(2,6-dimethyl-3-methylsulfonylphenyl)anthranilic acid; M.P. 266–267° C.

The sodium salt of N-(2,6-dimethyl-3-methylsulfonylphenyl)anthranilic acid can be prepared by dissolving the free acid in hot ethanol, treating the solution with an equivalent amount of sodium hydroxide in ethanol and evaporating the resulting mixture to dryness under reduced pressure.

A mixture of 1.4 g. of choline chloride and 3.4 g. of the sodium salt of N-(2,6-dimethyl-3-methylsulfonylphenyl)anthranilic acid in ethanol is heated to about 70° C. for 10–15 minutes. The sodium chloride that forms in the course of the reaction is removed by filtration and the filtrate is concentrated under reduced pressure to give a clear, oily residue from which the N-(2,6-dimethyl-3-methylsulfonylphenyl)anthranilic acid choline salt crystallizes on standing.

The following N-arylanthranilic acids are also prepared according to the procedure of Example 7 above from the reaction of potassium o-bromobenzoate with the specified 2,6-dimethyl-3-(lower alkylsulfonyl)aniline compound:

(a) From reaction with 2,6-dimethyl-3-ethylsulfonylaniline there is obtained N-(2,6-dimethyl-3-ethylsulfonylphenyl)anthranilic acid.

(b) From reaction with 3-t-butylsulfonyl-2,6-dimethylaniline there is obtained N-(3-t-butylsulfonyl-2,6-dimethylphenyl)anthranilic acid, M.P. 247–249° C. after crystallization from ethanol.

The preparation of the 2,6-dimethyl-3-(lower alkylsulfonyl)aniline compounds used as starting materials in the foregoing procedure can be illustrated by the preparation of 2,6-dimethyl-3-methylsulfonylaniline as follows: A solution of 4.4 g. of 2,6-dimethyl-3-methylthioacetanilide in 15 ml. of glacial acetic acid at 50° C. is treated with 6.4 ml. of 30% hydrogen peroxide, and the resulting solution is kept at 70–90° C. for 75 minutes. After cooling to room temperature, the solution is diluted with 50 ml. of water, and the solid 2,6-dimethyl-3-methylsulfonylacetanilide obtained is isolated, washed with water and dried; M.P. 214–215° C. This intermediate is converted to the desired 2,6-dimethyl-3-methylsulfonylaniline, M.P. 101–103° C., by basic hydrolysis to remove the N-acetyl group.

The N-(2,6-dimethyl-3-methylsulfonylphenyl)anthranilic acid product of this example can also be prepared by reaction of a mixture consisting of 17.5 g. of potassium anthranilate, 15.0 g. of methyl 3-bromo-2,4-dimethylphenyl sulfone, 1.7 g. of cupric acetate, 0.7 g. of N-ethylmorpholine, and 50 ml. of dry N,N-dimethylacetamide according to the procedure described in Example 7 above. The methyl-3-bromo-2,4-dimethylphenyl sulfone required as a starting material can be prepared by diazotization, in 48% hydrobromic acid, of 2,6-dimethyl-3-methylsulfonylaniline, followed by decomposition of the diazonium salt obtained in the presence of cuprous bromide. The operating details for this procedure are identical to those reported in Organic Syntheses, Coll. vol. III, John Wiley & Sons, Inc., 1955, p. 185, for the preparation of o-chlorobromobenzene from o-chloroaniline.

Example 10

By utilizing the procedure described in Example 7 above, from the reaction of a mixture consisting of 12.7 g. of potassium o-bromobenzoate, 12.0 of 2,6-dimethyl-3-phenylsulfonylaniline, 0.8 ml. of N-ethylmorpholine, and 1.5 g. of anhydrous cupric acetate in 23 ml. of dry N,N-dimethylacetamide, there is obtained N-(2,6-dimethyl-3-phenylsulfonylphenyl)anthranilic acid, M.P. 215–216° C., after recrystallization from aqueous ethanol.

In a similar manner, the following N-arylanthranilic acids are obtained from the reaction of potassium o-bromobenzoate with the specified aniline compounds:

(a) From reaction with 2,6-dimethyl-3-(p-methoxyphenylsulfonyl)aniline there is obtained N-[2,6-dimethyl-3-(p-methoxyphenylsulfonyl)-phenyl]anthranilic acid.

(b) From reaction with 2,6-dimethyl-3-(p-toluenesulfonyl)aniline there is obtained N-[2,6-dimethyl-3-(p-toluenesulfonyl)phenyl]anthranilic acid.

The 2,6-dimethyl-3-phenylsulfonylaniline used as a starting material in the foregoing procedure can be prepared by reacting 3-acetamido-2,4-dimethylbenzenesulfonyl chloride with benzene and aluminum chloride in dichloroethane, followed by basic hydrolysis of the intermediate 2,6-dimethyl-3-phenylsulfonylacetanilide to give the desired product; M.P. 114–117° C. and 124–125° C. The 2,6-dimethyl-3-(p-methoxyphenylsulfonyl)aniline and 2,6-dimethyl-3-(p-toluenesulfonyl)aniline are prepared in a similar manner by substituting anisole and toluene, respectively, for benzene in the first step above.

Example 11

A solution of 12.5 g. of methyl N-benzoyl-N-(2,6-dimethyl-3-phenylsulfonylphenyl)anthranilate in a mixture of 125 ml. of ethanol and 45 g. of 50% aqueous sodium hydroxide is heated under reflux for 2 hours. After cooling, the solution is diluted with 200 ml. of water and acidified with concentrated hydrochloric acid. The solid N-(2,6-dimethyl-3-phenylsulfonylphenyl)anthranilic acid obtained is isolated, dried, and crystallized from aqueous ethanol; M.P. 215–216° C.

By utilizing the foregoing procedure, the following N-arylanthranilic acids can be prepared by the alkaline hydrolysis of the specified N-acylated diphenylamine:

(a) From the alkaline hydrolysis of methyl N-benzoyl-N-(2,6 - dimethyl-3-dimethylsulfamoylphenyl)anthranilate there is obtained N-(2,6-dimethyl-3-dimethylsulfamoylphenyl)anthranilic acid, M.P. 172–172.5° C.

(b) From the alkaline hydrolysis of methyl N-benzoyl-N-(2,6 - dimethyl-3-methylthiophenyl)anthranilate there is obtained N-(2,6-dimethyl-3-methylthiophenyl)anthranilic acid. M.P. 210–211° C.

(c) From the alkaline hydrolysis of methyl N-benzoyl-N-(2,6 - dimethyl - 3 - methylsulfinylphenyl)anthranilate there is obtained N-(2,6 - dimethyl - 3 - methylsulfinylphenyl)anthranilic acid, M.P. 209–211.5° C., after crystallization from absolute ethanol.

(d) From the alkaline hydrolysis of methyl N-benzoyl-N-(2,6 - dimethyl - 3 - methylsulfonylphenyl)anthranilate there is obtained N-(2,6 - dimethyl - 3 - methylsulfonylphenyl)anthranilic acid, M.P. 266–267° C.

The preparation of the N-acylated diphenylamine compounds required as starting materials in the foregoing procedure can be illustrated by the preparation of methyl N-benzoyl-N-(2,6 - dimethyl - 3 - phenylsulfonylphenyl)anthranilate as follows:

To a solution of 26.1 g. of 2,6 - dimethyl - 3 - phenylsulfonylaniline and 10.1 g. of triethylamine in 250 ml. of benzene is added 14.1 g. of benzoyl chloride, the resulting mixture is heated under reflux for one hour and then evaporated to dryness. The solid residue is washed well with water, dried, and dissolved in 150 ml. of benzene. Phosphorus pentachloride (20.8 g.) is added to the benzene solution in portions and the mixture is heated under reflux until hydrogen chloride evolution ceases. The mixture is then subjected to distillation under reduced pressure until the solvent and phosphorus oxychloride are removed, leaving a residue of N-(2,6 - dimethyl - 3-phenylsulfonylphenyl)benzimidoyl chloride.

To a suspension of 5.1 g. of a 50% sodium hydride dispersion (mineral oil) in 100 ml. of diethylene glycol dimethyl ether maintained at 0–5° C. is added, in portions, 16.0 g. of methyl salicylate. The mixture is heated to 50° C., 38.4 g. of N-(2,6 - dimethyl - 3 - phenylsulfonylphenyl)benzimidoyl chloride is added, and the resulting mixture is heated at 100° C. for 30 minutes. After cooling, the mixture is diluted with 300 ml. of ice water and extracted with ether. The ether extract is washed with water, dried and evaporated to dryness under reduced pressure to give o-carbomethoxyphenyl N-(2,6 - dimethyl-3-phenylsulfonylphenyl)benzimidate. This product (20 g.) is heated at 260–270° C. for 30 minutes, and there is obtained the desired methyl N-benzoyl-N-(2,6 - dimethyl-3-phenylsulfonylphenyl)anthranilate.

Example 12

To a solution of 3.2 g. of N-(2,6 - dimethyl-3-sulfamoylphenyl)anthranilic acid in 15 ml. of N,N-dimethylformamide is added, in portions, 1.6 g. of a 50% sodium hydride suspension in mineral oil. When hydrogen evolution subsides, 6.0 g. of methyl iodide is added, and the mixture is heated at 60° C. for four hours. After cooling, the mixture is diluted with an equal volume of water, acidified with aqueous hydrochloric acid, and extracted with ether. The extract is washed with water, dried over anhydrous magnesium sulfate, and evaporated to dryness under reduced pressure. The residue obtained is heated with 2 N sodium hydroxide until a clear solution is obtained, and the alkaline solution is acidified with aqueous hydrochloric acid to give N-(2,6 - dimethyl - 3 - dimethylsulfamoylphenyl)anthranilic acid, which is isolated, dried, and purified by crystallization from aqueous ethanol; M.P. 172–172.5° C.

The sodium salt of N - (2,6 - dimethyl - 3 - dimethylsulfamoylphenyl)anthranilic acid is prepared by treating a solution of 1.0 g. of the free acid in hot ethanol with an equivalent amount of sodium hydroxide dissolved in ethanol, and evaporating the resulting mixture to dryness under reduced pressure.

A mixture of 1.4 g. of choline chloride and 3.7 g. of the sodium salt of N-(2,6 - dimethyl - 3 - dimethylsulfamoylphenyl)anthranilic acid in ethanol is heated to about 70° C. for 10–15 minutes. The sodium chloride that forms during the course of the reaction is removed by filtration and the filtrate is concentrated under reduced pressure to give a clear, oily residue from which N-(2,6-dimethyl - 3 - dimethylsulfamoylphenyl)anthranilic acid choline salt crystallizes on standing.

The N-(2,6 - dimethyl - 3 - sulfamoylphenyl)anthranilic acid employed as starting material in the foregoing procedure is prepared by reacting 3-acetamido-2,4-dimethylbenzenesulfonyl chloride with aqueous ammonia, hydrolyzing the resulting 3 - acetamido - 2,4 - dimethylbenesulfonamide, M.P. 259–259.5° C., with aqueous sodium hydroxide, and reacting the 3 - amino -2,4 - dimethylbenzenesulfonamide obtained, M.P. 184.5–185.5° C., with potassium o-bromobenzoate according to the procedure given in Example 1 above to give the desired N-(2,6-dimethyl-3-sulfamoylphenyl)anthranilic acid, M.P. 245.5–246° C., after several crystallizations from aqueous ethanol.

Example 13

A solution of 5.1 g. of N-(2,6 - dimethyl - 3 - phenylsulfamoylphenyl)anthranilic acid, 1.55 g. of sodium hydroxide and 11 g. of methyl iodide in 50 ml. of 95% ethanol is heated under reflux for one hour. The solution is allowed to cool, 50 ml. of dilute aqueous sodium hydroxide is added and the alkaline mixture is again heated under reflux until a clear solution is obtained. After cooling once again, the alkaline solution is acidified with dilute hydrochloric acid, and the solid N-[2,6-dimethyl - 3 - (N' - methyl - N' - phenylsulfamoyl)phenyl]anthranilic acid obtained is isolated and dried; M.P. 202.5–204.5° C., after three crystallizations from aqueous ethanol.

The N-(2,6-dimethyl-3-phenylsulfamoylphenyl)anthranilic acid, M.P. 209–210° C., used as starting material in the foregoing procedure is prepared by substituting aniline for aqueous ammonia in the procedure described in Example 12 above for the preparation of N-(2,6-dimethyl-3-sulfamoylphenyl)anthranilic acid.

Example 14

N - (2,6-dimethyl-3-methylthiophenyl)anthranilic acid (1.0 g.) is treated with 2 ml. of 2 N sodium hydroxide and to the resulting suspension is added a solution of 0.75 g. of sodium metaperiodate in 10 ml. of water. The mixture is kept at room temperature for one hour, and is then heated at 50° C. for 2 hours, and kept at room temperature for 16 hours. The mixture is next made alkaline with dilute aqueous sodium hydroxide, and the alkaline mixture is heated to 50–60° C., and filtered. The filtrate is acidified with concentrated hydrochloric acid, and cooled. The solid N-(2,6-dimethyl-3-methylsulfinylphenyl)anthranilic acid obtained is isolated and crystallized from 60% aqueous isopropyl alcohol; M.P. 190–192° C. A second crystalline modification is obtained by crystallization from absolute ethanol; M.P. 209–211.5° C.

By utilizing the above procedure, the following N-arylanthranilic acids are prepared by the oxidation of the specified N-(2,6-dimethyl-3-lower alkylthiophenyl) anthranilic acids:

(a) Oxidation of N-(2,6-dimethyl-3-ethylthiophenyl) anthranilic acid gives N-(2,6-dimethyl-3-ethylsulfinylphenyl)anthranilic acid.

(b) Oxidation of N-(2-methyl-3-methylthiophenyl) anthranilic acid gives N-(2-methyl-3-methylsulfinylphenyl)anthranilic acid. The N-(2-methyl-3-methylthiophenyl)anthranilic acid used as starting material can be prepared by the dechlorination of N-(6-chloro-2-methyl-3-methylthiophenyl) anthranilic acid according to the procedure described in Example 16, infra.

*Example 15*

A solution of 1.0 g. of N-(2,6-dimethyl-3-methylthiophenyl)anthranilic acid, 2.0 ml. of 2 N sodium hydroxide, and 7.5 g. of sodium metaperiodate in 40 ml. of water is heated at 90° C. for one hour. The hot solution is filtered, and the filtrate is cooled and acidified with concentrated hydrochloric acid. The solid N-(2,6-dimethyl-3-methylsulfonylphenyl)anthranilic acid obtained is isolated, dried, and crystallized from aqueous ethanol; M.P. 266–267° C.

The potassium salt of N-(2,6-dimethyl-3-methylsulfonylphenyl)anthranilic acid is prepared by treating a solution of the free acid is hot ethanol with an equivalent amount of potassium hydroxide dissolved in ethanol, and evaporating the resulting mixture to dryness under reduced pressure.

By utilizing the foregoing procedure, with the substitution of an equivalent quantity of N-(2-methyl-3-methylthiophenyl)anthranilic acid for the N-(2,6-dimethyl-3-methylthiophenyl)anthranilic acid, there is obtained N-(2-methyl-3-methylsulfonylphenylanthranilic acid.

*Example 16*

A mixture consisting of 3.84 g. of N-(6-chloro-2-methyl-3-dimethylsulfamoylphenyl)anthranilic acid, 1.2 g. of sodium acetate, 0.5 g. of 20% palladium on charcoal, and 250 ml. of 95% ethanol is treated with hydrogen at 3 atmospheres pressure until the uptake of hydrogen ceases. The catalyst is removed by filtration, and the filtrate is concentrated under reduced pressure to 100 ml., clarified by treatment with charcoal, filtered again, and diluted with an equal volume of water. The solid N-(2-methyl-3-dimethylsulfamoylphenyl)anthranilic acid obtained is isolated and crystallized once from toluene and twice more from aqueous ethanol; M.P. 193–194° C.

By utilizing the foregoing procedure, with the substitution of 3.2 g. of N-(6-chloro-2-methyl-3-methylthiophenyl) anthranilic acid for the N-(6-chloro-2-methyl-3-dimethylsulfamoylphenyl)anthranilic acid, there is obtained N-(2-methyl-3-methylthiophenyl)anthranilic acid.

*Example 17*

To a solution of 5.0 g. of N-(2,6-dimethyl-3-dimethylsulfamoylphenyl)anthranilic acid in 30 ml. of N,N-dimethylformamide is added, with stirring, 768 mg. of a 50% sodium hydride dispersion in mineral oil. After hydrogen evolution subsides, 11.9 g. of methyl iodide is added and the mixture is heated at 50° C. for 2 hours. After cooling, the mixture is diluted with 100 ml. of water, and the aqueous mixture is extracted with ether. The ether extract is washed, first with cold aqueous sodium carbonate, then with water, and dried over anhydrous magnesium sulfate. The dried solution is then evaporated to dryness to give methyl N-(2,6-dimethyl-3-dimethylsulfamoylphenyl)anthranilate.

In the foregoing procedure, by the substitution of 4.5 g. of N-(2,6-dimethyl-3-methylsulfonylphenyl)anthranilic acid for the N-(2,6-dimethylsulfamoylphenyl)anthranilic acid and 13.1 g. of ethyl iodide for the methyl iodide; there is obtained ethyl N-(2,6-dimethyl-3-methylsulfonylphenyl)anthranilate.

*Example 18*

A mixture consisting of 10.0 g. of N-(2,6-dimethyl-3-methylthiophenyl)anthranilic acid, 100 ml. of absolute ethanol and 10 ml. of concentrated sulfuric acid is heated under reflux for 24 hours. After cooling, the solution is diluted with 500 ml. of water and the aqueous mixture is extracted with ether. The ether extract is washed, first with cold aqueous sodium carbonate, then with water and dried over anhydrous magnesium sulfate. The dried ethereal solution is evaporated to dryness to give ethyl N-(2,6-dimethyl-3-methylthiophenyl)anthranilate.

In the foregoing procedure, by the substitution of 10.0 g. of N-(2,6-dimethyl-3-methylsulfinylphenyl)anthranilic acid for the N-(2,6-dimethyl-3-methylthiophenyl)anthranilic acid and 100 ml. of methanol for the ethanol, there is obtained methyl N-(2,6-dimethyl-3-methylsulfinylphenyl)anthranilate.

*Example 19*

A mixture consisting of 14.4 g. of 2-dimethylaminoethyl chloride hydrochloride, 36.9 g. of N-(6-chloro-2-methyl-3-dimethylsulfamoylphenyl)anthranilic acid, 20.2 g. of triethylamine and 125 ml. of N,N-dimethylformamide is heated at 90–100° C. for 24 hours. After cooling, the mixture is diluted with 250 ml. of ether. The precipitated solid is removed by filtration and the filtrate is extracted with an excess of dilute hydrochloric acid. The acidic aqueous extract is made alkaline by the addition of solid sodium carbonate and the alkaline solution is extracted with ether. After drying over anhydrous sodium sulfate, the ether extract is treated with an excess of hydrogen chloride. The solid 2-dimethylaminoethyl N-(6-chloro-2-methyl - 3 - dimethylsulfamoylphenyl)anthranilate hydrochloride obtained is isolated and crystallized from ethanol.

The free base, 2-dimethylaminoethyl N-(6-chloro-2-methyl-3-dimethylsulfamoylphenyl)anthranilate, can be obtained by dissolving the hydrochloride in warm water, treating the solution with excess 5% aqueous sodium hydroxide, extracting the alkaline solution with ether, washing the ether solution with water, drying, and evaporating the ether solution to dryness.

In the foregoing procedure, by the substitution of 18.6 g. of 3-diethylaminopropyl chloride hydrochloride for the 2-dimethylaminoethyl chloride hydrochloride and 39.0 g. of N-[2,6-dimethyl - 3 - (1 - morpholinylsulfonyl)phenyl] anthranilic acid for the N-(6-chloro-2-methyl-3-dimethylsulfamoylphenyl)anthranilic acid, there is obtained 3-diethylaminopropyl N - [2,6-dimethyl-3-(1-morpholinylsulfonyl)phenyl]anthranilate hydrochloride.

In the foregoing procedure, by the substitution of 17.2 g. of 2-diethylaminoethyl chloride hydrochloride for the 2-dimethylaminoethyl chloride hydrochloride and 38.1 g. of N-(2,6-dimethyl - 3 - phenylsulfonylphenyl)anthranilic acid for the N-(6-chloro-2-methyl-3-dimethylsulfamoylphenyl)anthranilic acid there is obtained 2-diethylaminoethyl N - (2,6-dimethyl-3-phenylsulfonylphenyl)anthranilate hydrochloride.

A suspension of 4.8 g. of 2-dimethylaminoethyl N-(6-chloro - 2 - methyl - 3 - dimethylsulfamoylphenyl)anthranilate hydrochloride in 250 ml. of acetone is heated almost to boiling and then treated with 2 g. of 50% aqueous sodium hydroxide solution. The mixture is filtered and to the filtrate is added a solution of 2.5 g. of methyl iodide in 25 ml. of acetone and the resulting mixture is allowed to stand at room temperature for 3 days. To the mixture is added 100 ml. of petroleum ether and the 2-dimethylaminoethyl N-(6-chloro - 2 - methyl-3-dimethylsulfamoylphenyl)anthranilate methiodide that precipitates is isolated and crystallized from ethanol-petroleum ether.

I claim:

1. A member of the class consisting of N-arylanthranilic acids chosen from among N-(2,6-dimethyl-3-dimethylsulfamoylphenyl)anthranilic acid, N - (6-chloro-2-methyl-3-dimethylsulfamoylphenyl)anthranilic acid, N-(2,6-dimethyl - 3 - methylthiophenyl)anthranilic acid, N-(2,6 - dimethyl-3-methylsulfinylphenyl)anthranilic acid, and N - (2,6-dimethyl-3-methylsulfonylphenyl)anthranilic acid; pharmaceutically-acceptable salts thereof; lower alkyl esters thereof; di-lower alkyl-amino alkyl esters thereof; and pharmaceutically-acceptable acid-addition salts and quaternary salts of the di-lower alkyl-amino alkyl esters thereof.

2. N - (2,6 - dimethyl-3-dimethylsulfamoylphenyl)anthranilic acid.

3. N - (6-chloro-2-methyl-3-dimethylsulfamoylphenyl)anthranilic acid.

4. N-(2,6-dimethyl - 3 - methylthiophenyl)anthranilic acid.

5. N - (2,6-dimethyl - 3 - methylsulfinylphenyl)anthranilic acid.

6. N - (2,6 - dimethyl-3-methylsulfonylphenyl)anthranilic acid.

References Cited

UNITED STATES PATENTS 3,176,015  3/1965  Jacob et al. _____ 260—243

FOREIGN PATENTS 630,842  6/1936  Germany.

OTHER REFERENCES

Lehmstedt et al.: "Ber. Deut. Chem.," vol. 70, pp. 838–849 (1937 QDI.D4) (Group 120 Library).

Bourquin et al.: "Helv. Chem Acta," vol. 41, pp. 1061–1072 (1958) QD1.H4.

LORRAINE A. WEINBERGER, *Primary Examiner.*

RICHARD K. JACKSON, *Examiner.*

P. J. KILLOS, *Assistant Examiner.*